US007143984B2

(12) United States Patent
Marjanski

(10) Patent No.: US 7,143,984 B2
(45) Date of Patent: Dec. 5, 2006

(54) THROTTLE LEVER FOR CONTROLLING THE SPEED OF AT LEAST ONE AIRCRAFT ENGINE

(75) Inventor: Dany Marjanski, Toulouse (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 11/108,113

(22) Filed: Apr. 18, 2005

(65) Prior Publication Data

US 2005/0236525 A1 Oct. 27, 2005

(30) Foreign Application Priority Data

Apr. 21, 2004 (FR) .................................. 04 04206

(51) Int. Cl.
*B64C 13/04* (2006.01)

(52) U.S. Cl. ........................................ 244/234; 74/491

(58) Field of Classification Search ................ 244/220, 244/234, 228, 221, 230; 74/491, 471 R, 74/483 R See application file for complete search history.

(56) References Cited

U.S. PATENT DOCUMENTS 2,417,691 A * 3/1947 Kelley et al. ............... 244/220
2,789,418 A 4/1957 Machlanski
2,865,171 A 12/1958 Gaubatz
2,901,919 A 9/1959 Cravero
2,945,347 A 7/1960 Colley
2,967,436 A * 1/1961 Steinlein ................... 74/471 R
2,999,355 A * 9/1961 Fishpaw et al. .............. 60/230
4,567,786 A * 2/1986 Sakurai .................... 74/483 R
4,651,954 A 3/1987 Miller

FOREIGN PATENT DOCUMENTS

EP 0431655 6/1991

* cited by examiner

*Primary Examiner*—Galen Barefoot
(74) *Attorney, Agent, or Firm*—Stevens, Davis, Miller & Mosher, LLP

(57) ABSTRACT

A throttle lever that for being pivoted by a pilot of an aircraft may include a guidance device that is integral with the lever and capable of interacting with first and second guide tracks. The first guide track allows the lever to be moved to continuously control the reverse thrust speed. The second guide track has a plurality of detents for receiving the guidance device so that the lever may take different positions, each of which controls a particular forward engine speed. An auxiliary guide track allows the lever to be moved to continuously control the forward speed of the engine.

7 Claims, 5 Drawing Sheets

THROTTLE LEVER FOR CONTROLLING THE SPEED OF AT LEAST ONE AIRCRAFT ENGINE

FIELD OF THE INVENTION

The present invention concerns a throttle lever for controlling the speed of at least one aircraft engine.

BACKGROUND OF THE RELATED ART

Although not exclusively, the present invention applies more particularly to a throttle lever for controlling a turbo-propeller, that is to say an engine comprising a gas turbine driving one or more propellers by means of a reduction gear.

It is known that a throttle lever usually comprises:

a control lever which is capable of being pivoted either side of a predetermined position respectively forward and backward, under the manual action of a pilot of the aircraft, and which comprises a guidance means integral with said control lever and capable of interacting with at least a first and a second guide tracks which limit the movements of said guidance means and thus of said control lever;

said first guide track which allows the control lever to be moved continuously backward from said predetermined position, to control continuously the speed in reverse thrust; and said second guide track, for the forward movement of the control lever, which comprises a plurality of detents capable of receiving said guidance means in order to allow the control lever to take one of a plurality of different positions, each of said positions controlling a particular forward speed of said engine.

The presence of said detents allows a controlled management of certain particular engine speeds, such as the take off/go-around speed for example.

Such a throttle lever is not however well suited to certain types of flight or phases of flight, particularly military phases of flight such as in-flight refueling for example, for which the control of speed requires a very great sensitivity. The forward speed of the engine or engines must specifically, in such situations, be able to be modified in a very flexible manner, without interruption, and be adapted progressively. Such a sensitivity cannot be obtained with the aforementioned type of throttle lever, due to the presence of said detents which prevent an uninterrupted movement of the control lever.

Furthermore, due to this disadvantage, there is a tendency to limit the number of detents as much as possible, and therefore the number of particular speeds that can be thus managed individually.

SUMMARY OF THE INVENTION

The present invention concerns a throttle lever making it possible to remedy these disadvantages.

Consequently, according to the invention, said throttle lever of the type comprising:

a control lever which is capable of being pivoted either side of a predetermined position respectively forward and backward, under the manual action of a pilot of the aircraft, and which comprises a guidance means integral with said control lever and capable of interacting with at least a first and a second guide tracks which limit the movements of said guidance means and thus of said control lever;

said first guide track which allows the control lever to be moved continuously backward from said predetermined position, to control continuously the speed in reverse thrust; and said second guide track, for the forward movement of the control lever, which comprises a plurality of detents capable of receiving said guidance means in order to allow the control lever to take one of a plurality of different positions, each of said positions controlling a particular forward speed of said engine, is noteworthy in that it also comprises an auxiliary guide track allowing the control lever to be moved continuously forward from said predetermined position, to control continuously the forward engine speed.

Thus, thanks to said auxiliary guide track, the forward speed of the engine can be controlled continuously, which makes it possible to obtain an extremely sensitive throttle lever and thus remedy the aforementioned disadvantages.

In addition, according to the invention, said auxiliary guide track has a range of movement that is longer than the range of movement of said second guide track. This makes it possible to obtain a very wide speed control range.

Naturally, thanks to the presence of said second guide track comprising detents, the advantage of a controlled management for a certain number of particular speeds is retained.

Furthermore, as thanks to the invention the detents of said second guide track no longer hamper the sensitivity of the throttle lever (obtained thanks to said auxiliary guide track), many detents can be added to said second guide track, which makes it easier to manage a large number of particular speeds.

Thus, advantageously, said second guide track comprises a plurality of detents making it possible to control at least some of the following speeds:

take off/go-around speed;

in-flight idle speed;

ground idle speed;

fast cruise speed;

cruise speed;

climb speed; and the speed for the loss of an engine.

In a particular embodiment:

said throttle lever also comprises a first connector track between said second guide track and said auxiliary guide track and this first connector track is situated at a detent of said second guide track, making it possible to control the in-flight idle speed; and/or said throttle lever also comprises a second connector track between said second guide track and said auxiliary guide track, and this second connector track is situated at a detent of said second guide track, making it possible to control the cruise speed; and/or said guidance means comprises a peg which is capable of moving into interacting longitudinal recesses forming respectively said guide tracks.

BRIEF DESCRIPTION OF THE DRAWINGS

The figures of the appended drawing will make it abundantly clear how the invention can be embodied. In these figures, identical reference numbers identify similar elements.

DETAILED DESCRIPTION OF THE INVENTION

Figure 1:
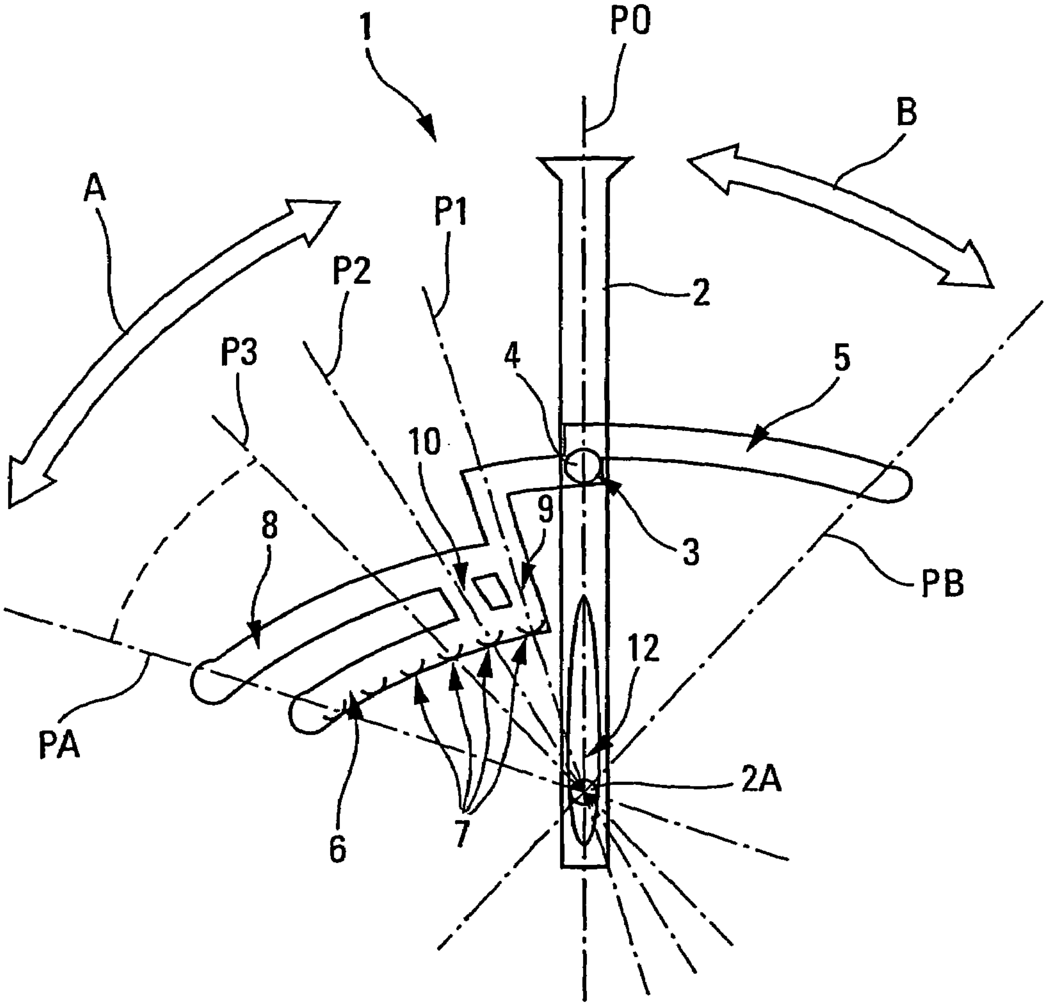
FIG. 1 shows schematically a throttle lever according to the invention.

The throttle lever 1 according to the invention and shown schematically in FIGS. 1 to 12 is intended to control the speed of at least one aircraft engine, in particular of a military transport airplane.

Although not exclusively, said throttle lever 1 applies more particularly to the control of a turbopropeller, that is to say an engine comprising a gas turbine driving one or more propellers via a reduction gear.

Said throttle lever 1 is of the type comprising:

- a normal manual control lever 2, which is capable of being pivoted (about a fixed pivot 2A) either side of a predetermined position PO respectively forward (in the two directions illustrated by a double arrow A) and backward (in the two directions illustrated by a double arrow B), under the manual action of an aircraft pilot. Said control lever 2 comprises a guidance means 3 (preferably comprising a peg 4 specified hereinafter) integral with said control lever 2 and capable of interacting with at least first and second concentric guide tracks 5 and 6 which limit the movements of said guidance means 3 and thus of said control lever 2;
- said guide track 5 which allows the control lever 2 to be moved continuously from said predetermined position PO backward (arrow B), to control continuously the speed in reverse thrust; and
- said guide track 6, for the forward (arrow A) movement of the control lever 2, which comprises a plurality of detents 7 capable of receiving said guidance means 3 while having a shape adapted so as to allow the control lever 2 to take one of a plurality of different (angular) positions P1, P2, P3, PA. Each of said (angular) positions P1, P2, P3, PA controls a particular forward speed of said engine. In this case, the forward movement of the control lever 2 is not continuous, but is interrupted at each detent 7, each of said detents 7 being capable of holding said control lever 2 in position.

According to the invention, said throttle lever 1 also comprises a concentric auxiliary guide track 8, allowing the control lever 2 to be moved continuously, from said predetermined position PO forward (arrow A), to control continuously the forward speed of the engine. This auxiliary guide track 8 therefore has no obstacles (detents, etc) which disrupt the movement of the control lever 2.

Thanks to this auxiliary guide track 8, the forward speed of the engine may therefore be controlled continuously, which makes it possible to obtain a very sensitive throttle lever 1, having a very flexible operation, for the forward speed.

In addition, according to the invention, said auxiliary guide track 8 has a range of movement that is longer than the range of movement of said guide track 6. The throttle lever 1 thus has a very wide range of continuous control of the forward speed.

Consequently, thanks to the invention, there is a combination in forward flight of the advantages of a continuous control (auxiliary guide track 8) and of a stepped control (detents 7 of the guide track 6), that is to say respectively:

- a great sensitivity; and
- a controlled management of particular speeds.

Accordingly, said throttle lever 1 also comprises at least one connector track 9, 10 which allows the guidance means 3 to pass from the guide track 6 to the auxiliary guide track 8, and vice-versa. To do this, in a preferred embodiment, the peg 4 of said guidance means 3 is capable of moving into interacting longitudinal recesses, of appropriate size, forming respectively said guide tracks 5, 6 and 8 and said connector tracks 9 and 10.

In a particular embodiment, the throttle lever 1 comprises two connector tracks 9 and 10, which makes it possible to double the connection capability.

In addition:

- said connector track 9 is arranged at a detent 7 used to control, with an associated position P1 of the control lever 2, the in-flight idle speed; and
- said connector track 10 is arranged at a detent 7 used to control, with an associated position P2 of the control lever 2, the cruise speed.

As, thanks to the invention, the detents 7 of said guide track 6 no longer hamper the sensitivity of the throttle lever 1 (obtained thanks to said auxiliary guide track 8), many detents 7 can be added to said guide track 6, which makes it easier to manage a large number of particular speeds.

Thus, in a particular embodiment, said guide track 6 comprises a plurality of detents 7 used to control at least some of the following speeds:

- take off/go-around speed;
- in-flight idle speed;
- ground idle speed;
- fast cruise speed;
- cruise speed;
- climb speed; and
- the speed for the loss of an engine.

FIGS. 2 to 12 show different positions of the throttle lever 1, used to demonstrate all the advantages of the latter.

Figure 3:
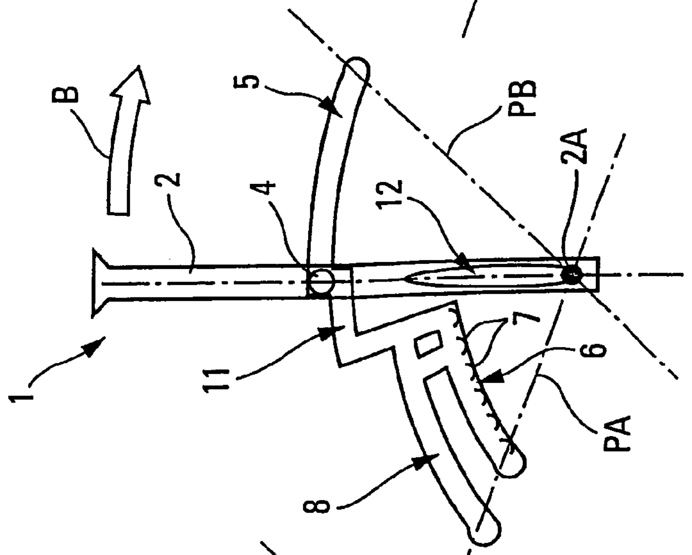
Figure 2:
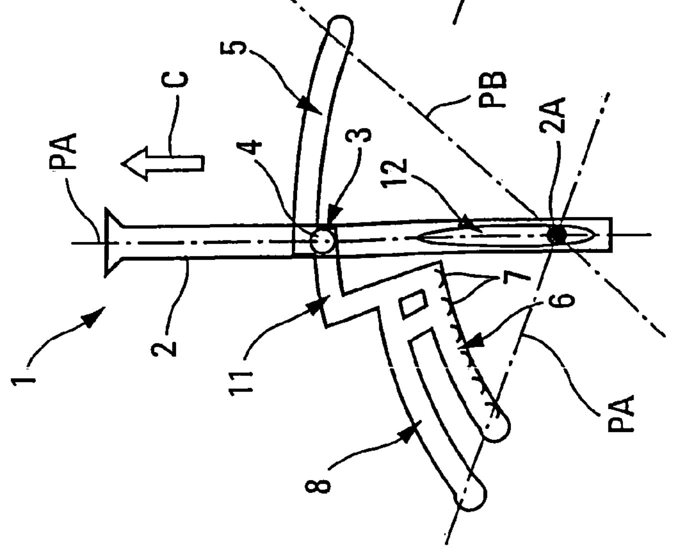

In FIGS. 2 and 3, the throttle lever 1 is in positions used to control the in-flight idle speed. In the position in FIG. 2, the guidance means 3 is opposite a connector track 11 connected to the guide tracks 6 and 8, whereas in the position in FIG. 3, it is opposite the guide track 5. To pass from the position in FIG. 2 to that in FIG. 3, it is necessary to pull the control lever 2 upward, as illustrated by the arrow C. For this purpose, said control lever 2 comprises a tapered recess 12, which receives said fixed pivot 2A.

Figure 4:
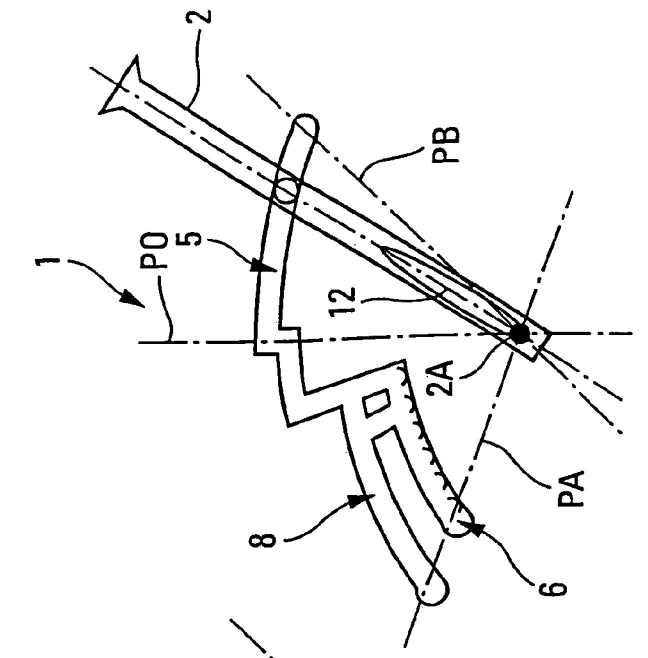
FIGS. 2 to 12 show different speed control positions for the throttle lever of FIG. 1.

From the position in FIG. 3, the control lever 2 can be moved continuously backward (arrow B), as shown in FIG. 4, to continuously control the speed in reverse thrust.

Figure 6:
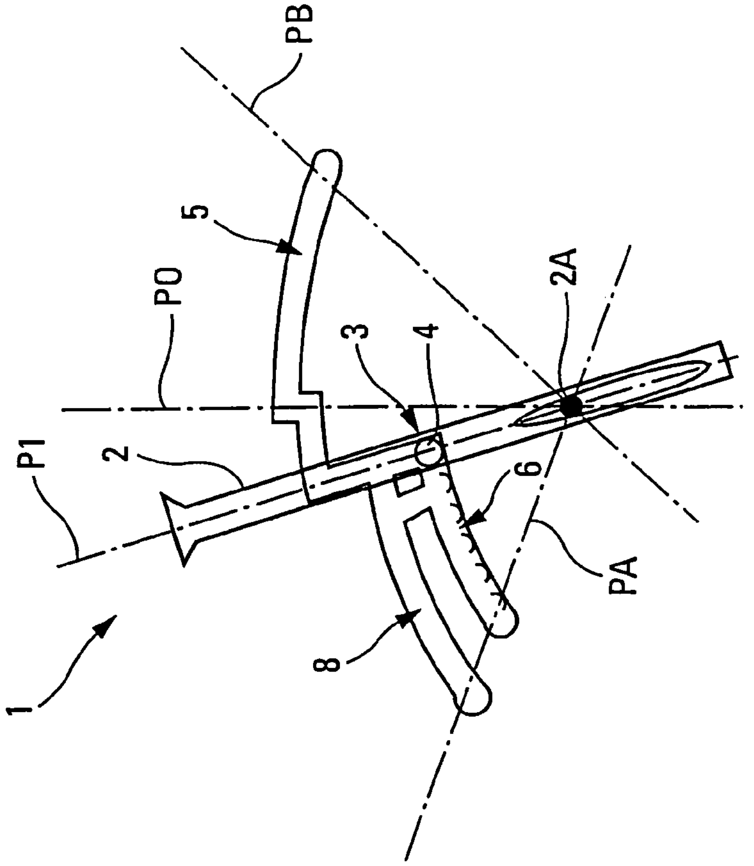
Figure 5:
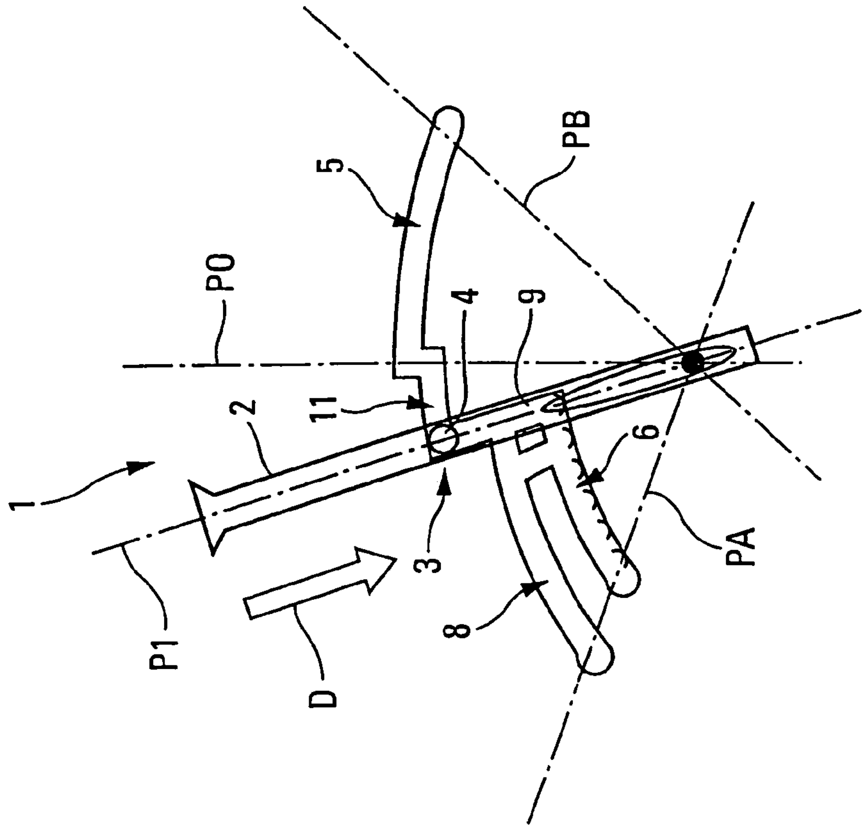

In FIGS. 5 and 6, the throttle lever 1 is in positions used to control the ground idle speed (angular position P1 of the control lever 2). In the position in FIG. 5, the guidance means 3 is opposite the connector track 11, whereas in the position in FIG. 6, it is opposite the guide track 6. To pass from the position in FIG. 5 to that in FIG. 6, it is necessary to push the control lever 2 downward along the connector track 9, as illustrated by an arrow D.

Figures 7, 8, 9:
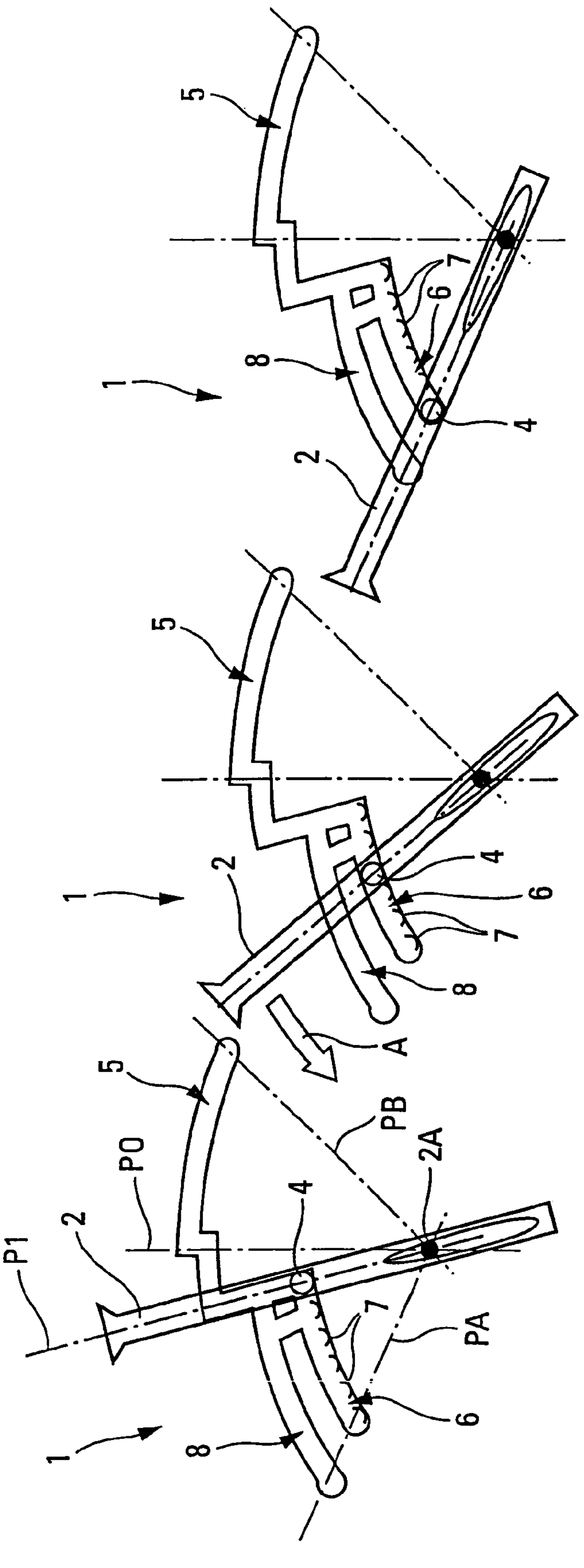

From the position in FIG. 6, the control lever 2 can be moved forward in steps, as shown in FIGS. 7 to 9. FIG. 7 corresponds to FIG. 6, and FIGS. 8 and 9 represent the control of particular speeds defined by particular detents 7 of the guide track 6.

Figure 12:
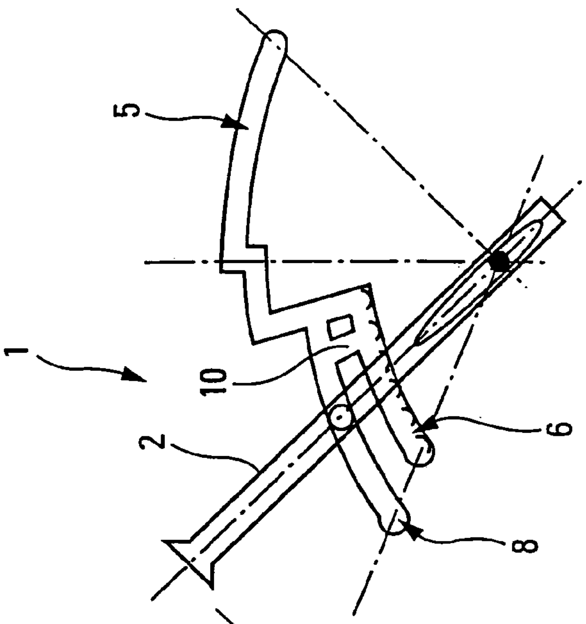
Figure 11:
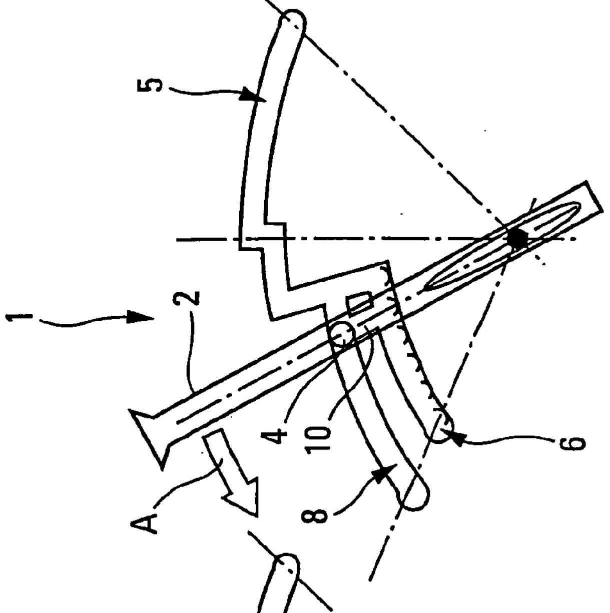
Figure 10:
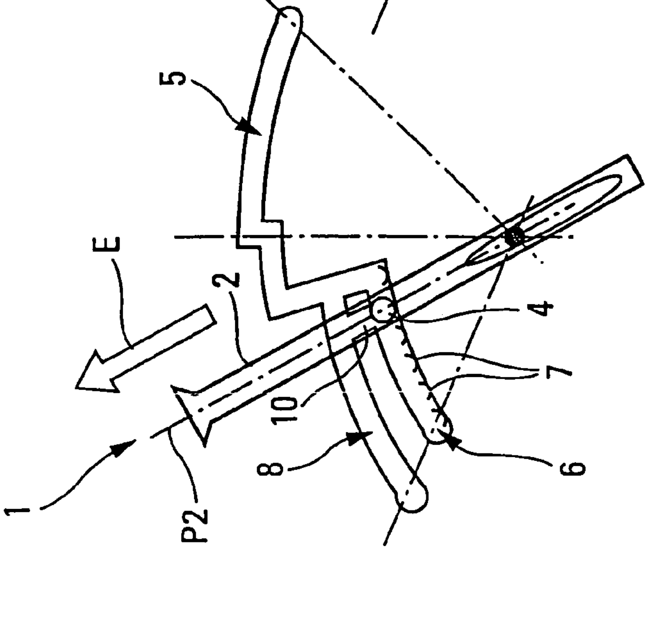

In FIG. 10, the control lever 2 is in the position P2 (corresponding to a detent 7 on the guide track 6 for the peg 4) used to control the cruise speed. From this position, the control lever 2 can be moved to the position in FIG. 11 by pulling on the latter, as illustrated by an arrow E such that the peg 4 moves along the connector track 10 to join the auxiliary guide track 8. From this last position, the control lever 2 can be moved forward continuously to control continuously the forward speed, as shown in FIG. 12.

The invention claimed is:

1. A throttle lever for controlling the speed of at least one aircraft engine, said throttle lever (1) comprising:

a control lever (2); and first and second guide tracks (5, 6) and an auxiliary guide track (8), wherein:

said control lever is capable of being pivoted either side of a predetermined position (PO) respectively forward and backward, under manual action of a pilot of the aircraft, and comprises a guidance means (3) integral with said control lever (2) and capable of interacting with at least said first and second guide tracks (5, 6) which limit movements of said guidance means (3) and thus of said control lever (2), said first guide track (5) allows the control lever (2) to be moved continuously backward from said predetermined position (PO), to control continuously the speed in reverse thrust, said second guide track (6), for the forward movement of the control lever, comprises a plurality of detents (7) capable of receiving said guidance means (3) in order to allow the control lever (2) to take one of a plurality of different positions, each of said positions controlling a particular forward speed of said engine, and said auxiliary guide track (8) allows the control lever (2) to be moved continuously forward from said predetermined position (PO), to control continuously the forward engine speed.

2. The throttle lever as claimed in claim 1, wherein said auxiliary guide track (8) has a range of movement that is longer than a range of movement of said second guide track (6).

3. The throttle lever as claimed in claim 1, wherein said second guide track (6) comprises a plurality of detents (7) making it possible to control at least some of the following speeds:

take off/go-around speed;

in-flight idle speed;

ground idle speed;

fast cruise speed;

cruise speed;

climb speed; and the speed for the loss of an engine.

4. The throttle lever as claimed in claim 1, which also comprises a first connector track (9) between said second guide track (6) and said auxiliary guide track (8) and in which said first connector track (9) is situated at a detent (7) of said second guide track (6) making it possible to control the in-flight idle speed.

5. The throttle lever as claimed in claim 1, which also comprises a second connector track (10) between said second guide track (6) and said auxiliary guide track (8), and in which said second connector track (10) is situated at a detent (7) of said second guide track (6), making it possible to control the cruise speed.

6. The throttle lever as claimed in claim 1, wherein said guidance means (3) comprises a peg (4) which is capable of moving into interacting longitudinal recesses forming respectively said guide tracks (5, 6, 8).

7. An aircraft, which comprises a throttle lever (1) as specified in claim 1.

* * * * *